United States Patent [19]

Terhune

[11] Patent Number: 5,114,664
[45] Date of Patent: May 19, 1992

[54] METHOD FOR IN SITU EVALUATION OF CAPACITIVE TYPE PRESSURE TRANSDUCERS IN A NUCLEAR POWER PLANT

[75] Inventor: James H. Terhune, San Jose, Calif.

[73] Assignee: General Electric Company, San Jose, Calif.

[21] Appl. No.: 695,840

[22] Filed: May 6, 1991

[51] Int. Cl.⁵ ............................................. G21C 17/00
[52] U.S. Cl. .................................. 376/245; 376/250; 376/252; 73/4 R; 73/718; 73/724; 381/174; 324/228
[58] Field of Search ............... 376/245, 247, 250, 252; 367/181, 191; 381/174; 324/228; 73/4 R, 718, 724

[56] References Cited

U.S. PATENT DOCUMENTS

| | | | |
|---|---|---|---|
| 3,182,489 | 5/1965 | Hamilton | 73/67 |
| 4,134,064 | 1/1979 | Jacobs et al. | 324/201 |
| 4,383,431 | 5/1983 | Gelernt | 73/4 R |
| 4,896,525 | 1/1990 | Breimesser | 73/1 R |

Primary Examiner—Brooks H. Hunt
Assistant Examiner—Chrisman D. Carroll
Attorney, Agent, or Firm—Robert R. Schroeder

[57] ABSTRACT

An apparatus and method to facilitate the in situ detection of small leaks in fluid-filled, capacitive type pressure transducers by remotely and non-intrusively inducing a brief time varying transient signal, and then analyzing the frequency response of the transducer to such excitation in order to detect the presence and effects of a fluid leak. The adverse effect of this induced transient signal on the process control circuitry is insignificant, while providing for an accurate and sensitive method for detecting the extent of fluid loss in the transducer when evaluated according to the present invention. As a consequence of such transducer evaluation techniques, frequency responsive characteristics of such devices may be recorded and self-correlated over long periods of time. Such self-correlatoin provides an accurate, transducer-specific historical profile which may be used as a means for detecting malfunction anomalies in the output of the pressure sensing transducer and predicting when the device will fail due to loss of internal dielectric fluid.

9 Claims, 5 Drawing Sheets

METHOD FOR IN SITU EVALUATION OF CAPACITIVE TYPE PRESSURE TRANSDUCERS IN A NUCLEAR POWER PLANT

BACKGROUND OF THE INVENTION

Nuclear power plants have traditionally been designed for achieving safe and reliable performance through the monitoring and analysis of various key operational parameters. Data derived from such monitoring components may be used to initiate emergency procedures, such as high and low pressure water injection into the reactor core in the event of an unexpected plant transient, as well as providing for operational control of feedwater flows, recirculating flows, containment levels, and like system operating processes. As such, there is a need for sensing components that accurately convey temperature, level, pressure, and flow rates of plant processes so that operating conditions may be accurately monitored. Where nuclear safety related components are involved, sensing component redundancy is generally employed for back-up and calibration purposes. Safety related system components or instrumentation used in nuclear related facilities must be certified to meet rigorous criteria of nuclear regulatory agencies such as the Nuclear Regulatory Commission (NRC) to assure long term operational reliability under extreme conditions. The NRC typically requires an IEEE electrical classification of 1E for these nuclear safety related components.

One such system monitoring component is a pressure transducer of a capacitive type. Such devices exhibit a change in capacitance relative to the pressure exerted upon the device's pressure sensitive surface which may then be electronically converted into a d.c. signal. In addition to providing data on operating pressures, process flow rates and liquid levels are often derived from measured pressure data, as well. Typical of the capacitive pressure transducers rated by the NRC and employed in nuclear safety related applications is the pressure transmitter. However, such transmitters, containing fluid-filled, pressure sensing, capacitive type pressure transducers have exhibited a tendency to lose internal dielectric fluid over a period of time through cracks and leaking seals. Since the capacitive output of such a pressure transducer is affected by the volume of dielectric fluid separating capacitive plates within the transducer, the corresponding d.c. output of such a leaking device will drift over time in response to a given pressure condition. Leakage can be tolerated to a degree as long as the functional integrity of the transducer can be assured. Without a method for accurately predicting when a given transducer is likely to reach a point of catastrophic failure, transducers may be prematurely removed as a result of an overabundance of caution—a "better safe than sorry" preventative maintenance program. In order to accurately monitor various fluid pressures throughout a nuclear power plant the fluid filled, capacitive type pressure transducers are periodically calibrated in order to detect, determine and accommodate for the effect of such leakage upon the integrity of the measured output of such devices.

Capacitive type pressure transducers are typically used to monitor wide ranging pressures (0–1200 p.s.i.g.) for a wide variety of plant processes. Transducers are generally rack mounted on local instrument panels or permanently installed directly into process lines within the plant. In the latter case, the transducers may be considered permanently installed and would not be removed for examination or testing because of the difficulty and expense of removing the often remotely-mounted devices. Access to permanently installed instrumentation may be difficult if not impracticable. In a nuclear power plant application, the problem of access to the devices is compounded by the presence of contamination since transducers may be systematically exposed to low levels of radiation or designed to function within a radiation field. Therefore, a method of remote calibration is preferred.

Over the recent past, various methods of calibration of such capacitive type transducers have been undertaken. One such method is to compare outputs from similar, redundant capacitive type transducers employed under similar operating conditions. Outputs of such redundant devices are then compared and cross-correlated to detect and evaluate the effect of any leakage on the output of the monitored transducer. Such cross-correlation of calibration data between redundant sensors may indicate some leaks, but only if the functional integrity of at least one of the transducers is assured. Further, unavoidable environmental process noise signals will often obscure effects of small leaks in the output signal. Therefore, calibration alone, in addition to being time consuming, is often ill-suited for the detection of small leaks.

Another method of calibration of such pressure sensors includes comparison of the outputs from non-redundant sensors, given a known source pressure. However, such data is of limited value since comparison against a standard output is often clouded by the presence of process noise fluctuations which produce a noise signal superimposed on a relatively constant value pressure indication. Even if transducers were available for removal for bench calibration using noise free sources of known pressures, such calibration suffers from the additional disadvantages of being labor intensive, obtrusive, potentially hazardous and requiring substantial coordination between operations and maintenance departments.

It is critical to assure that a capacitive type sensing device employed in a nuclear safety related application is functioning properly, even if its suffers from slow dielectric leakage. This assures that the device will accurately respond to fast and unexpected plant transients to which a nuclear power facility may be subjected. Therefore, a means of directly and accurately assessing the functional integrity of these pressure devices is desirable. Such a means would be most effective if it were non-intrusive, amenable to remote observation, continuous during normal operation, and capable of detecting and tracking small leakages even in the presence of process noise signals.

SUMMARY OF THE INVENTION

The present invention is addressed to an apparatus and method to facilitate the in situ detection of small leaks in fluid-filled, capacitive type pressure transducers by remotely and non-intrusively inducing a brief transient signal, and then analyzing the response to such excitation in order to detect the presence and effects of a fluid leak. The adverse effect of this induced transient signal on the process control circuitry is insignificant, while providing for an accurate and sensitive method for detecting the extent of fluid loss in the transducer when evaluated according to the present invention. As a consequence of such transducer evaluation techniques, frequency responsive characteristics of such devices may be recorded and self-correlated over long periods of time. Such self-correlation can provide an accurate, transducer-specific historical profile which may be used as a means for detecting malfunction anomalies in the output of the pressure sensing transducer device and predicting when the device will fail due to loss of internal dielectric fluid.

The in situ evaluation technique described greatly decreases the amount of time required to conduct performance related measurements on functionally operative pressure sensing devices. Using the technique of the present invention, evaluation of pressure transducers mounted plant-wide may be quickly and remotely performed through the use of multiplexing and autoprocessing methods without requiring disruption of normal plant operations. Routine periodic "polling" of transducer responses to magnetically induced transients generates a library of transducer-specific output frequency responsive characteristics. Correlation of such historical characteristics with benchmark frequency characteristics provided by model transducers with known leakage levels enables plant personnel to take a progressively leaking transducer "off line" prior to its total failure, while optimizing the length of time a transducer may safely remain in a circuit. This ability to remove transducer prior to its failure is of particular value in nuclear safety related applications where functional integrity of process monitoring instrumentation is critical.

Another feature of the invention is to provide an apparatus for evaluating the performance of a pressure responsive transducer having a surface movable with pressure induced volume variations of a contained fluid and deriving an output signal in correspondence with the orientation of said surface. The apparatus includes a test coil arrangement positioned in field influencing adjacency with the transducer selectively energizable for generating a magnetic field affecting said surface. An excitation circuit is coupled with the test coil arrangement and is responsive to a control input for effecting energization of the test coil arrangement. A monitoring device is positioned at the transducer output to detect transducer output signals, providing a corresponding monitor signal. A controller is provided for deriving a control input as a predetermined time varying signal, and responsive to the monitor signal to derive a frequency based readout having a correlative fundamental with the orientation of said transducer surface.

Another feature of the invention is to provide a method for evaluating the performance of a pressure responsive transducer having a surface movable with pressure induced volume variations of a contained fluid and an output signal varying in correspondence with the orientation of its surface, comprising the steps of:

generating a time varying magnetic field from a location effecting a field induced disturbance of the surface;

monitoring the output signal for a corresponding time varying signal component;

deriving a predetermined frequency component of a detected time varying signal component;

storing the predetermined frequency component;

comparing the predetermined frequency component with a previously derived frequency component to determine the presence of a frequency shift; and correlating the frequency shift with the orientation of the surface so as to evaluate the volume of fluid contained therein.

Another feature of the invention provides in a nuclear power generating facility having at least one pressure responsive transducer immersed in a process fluid, the method for evaluating the performance of the pressure responsive transducer having a surface movable with pressure induced volume variations of a contained dielectric fluid and deriving an output signal in correspondence with the orientation of its surface, comprising the steps of:

generating a time varying magnetic field from a location effecting a field induced disturbance of the surface;

monitoring the output signal for a time varying signal component;

determining a predetermined frequency component of a detected time varying signal component;

storing the predetermined frequency component;

comparing the predetermined frequency component with a previously derived frequency component to determine the presence of a frequency shift; and correlating the frequency shift with the orientation of the surface.

Other features of the invention will, in part, be obvious and will, in part, appear hereinafter. The invention, accordingly, comprises the apparatus, the method, the construction, combination of elements, arrangement of parts and the steps which are exemplified in the following detailed disclosure. For a fuller understanding of the nature and objects of the invention, reference should be had to the following detailed description taken in connection with the accompanying drawings.

DETAILED DESCRIPTION OF THE INVENTION

Pressure responsive transducers of the capacitive type and of the type under the evaluation procedures addressed herein are encountered throughout a nuclear power plant. A typical plant may employ hundreds of capacitive type transducers situated in numerous environmental zones within the boiling water reactor (BWR) region of the facility. The pressure transducers may be either rack mounted or installed directly into various process lines, making accessibility and surveillance difficult and possibly hazardous.

Figure 1:
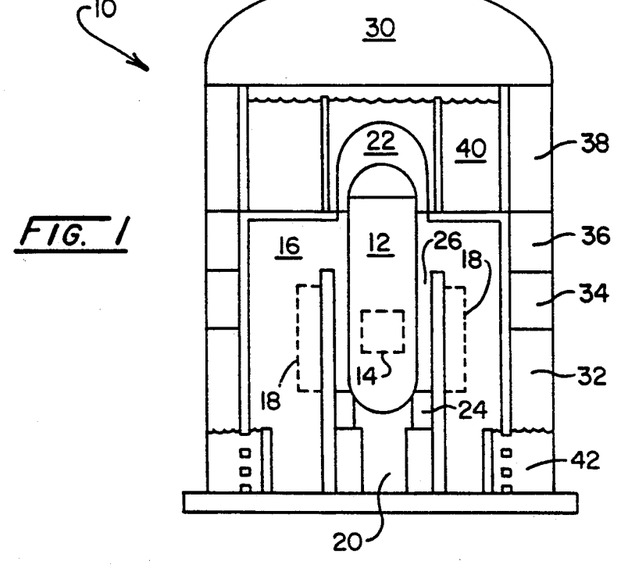
FIG. 1 is a general elevational view of a boiling water reactor (BWR) portion of a nuclear power generating facility showing various environmental zones.

Referring to FIG. 1, a BWR 10 is shown generally with various environmental zones depicted. One system operating pressure, typically monitored by a pressure transducer, is the hydraulic pressure associated with the hydraulic control units, housed in the containment area of the BWR at 34 and used to control positioning of fuel rods within fuel core 14. Mounting of such transducers would be through utilization of a rack, shown generally in FIG. 3. Further, transducers may be employed to function as pressure switches in various dry well zones within the BWR 10, depicted generally at 16, 18, 20, 22, and 24. Pressure transducers may also be employed in a nuclear power plant to monitor such critical operating parameters as steam pressure as at 12, reactor circulation as at 38, stand-by liquid control system pressures as at 36, core spray pressures, leak detection and control systems, as well as other numerous and varied key system operating pressures not specifically disclosed.

Figure 2:
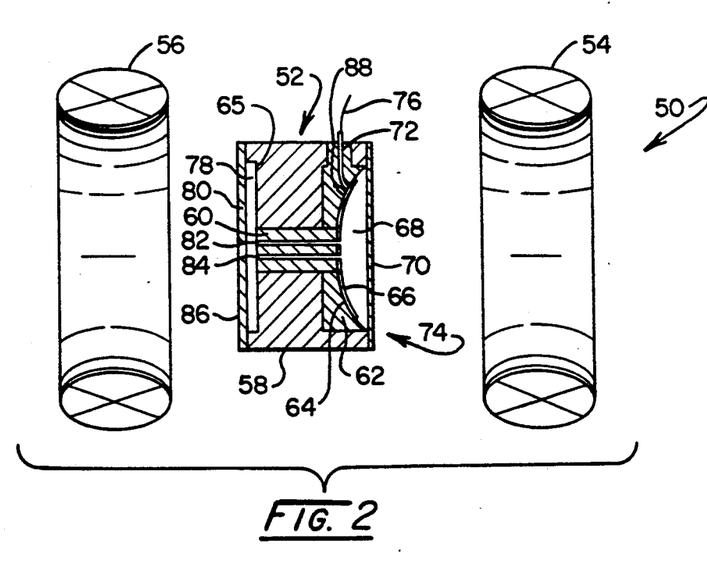
FIG. 2 is a cross sectional view of a capacitive type pressure transducer portion of a pressure transmitter positioned intermediate field coils of a Helmholtz test coil arrangement according to the invention.

Looking to FIG. 2, a pressure responsive capacitive type transducer is represented generally at 52 and is depicted in schematic form. Such a transducer 52 is typically employed as the pressure sensing element of a commercial pressure transmitter (not shown) such as a Model 1152-T080 Alpha Line ™ transmitter, supplied by Rosemount, Inc.

The transducer 52 is shown consisting of a body 58 configured to retain a ceramic insert 60 and an insulator 62. The insert 60 is seen to be positioned within one side of body 58 and through insulator 62. Insulator 62 is formed having a concavely shaped surface 64 which serves as a base for a thin metalized layer 66. Concavely shaped, metalized surface 66 establishes a cavity represented at 68. The cavity 68 is enclosed by a thin, flexible metallic membrane, or diaphragm 70. By positioning a non-conductive material such as a dielectric fluid within the cavity 68, it may be observed that a capacitor is derived. In this regard, note that a fill tube 72 is located for fluid filling communication with the cavity 68 from the outward surface of body 58. Thus, by filling the cavity 68 from tube 72 with such a dielectric fluid, a capacitor, as represented generally at 74, is defined which serves as a sensing component, the capacitive output of which will vary with the volumetric variations of the dielectric fluid within cavity 68 as retained by flexing diaphragm 70. Electrical lead 76, often channeled through fill tube 72, is provided for electrical communication between pressure transmitter control circuity (not shown) and capacitor 74 for electronically converting its capacitance to a d.c. output signal, typically in the range of 4-20 mADC.

Pressure variations are transmitted to the cavity 68 from a fluid reservoir 78 located on the opposite side of body 58. Reservoir 78 is seen covered by a flexible pressure member or diaphragm 80. This diaphragm 80 is located within the housing within which transducer 52 is mounted such that it will react to externally applied fluid pressures. Communication between the diaphragm 80 influenced reservoir 78 and the cavity 68 of capacitor 74 is by thin, cylindrical passageways, two of which are revealed at 82 and 84. Thus, a variation in pressure at the pressure member 80 will be responded to at cavity 68 by a variation in the location of diaphragm 70 with respect to metalized surface 66 and a corresponding volumetric variation of cavity 68.

In operation, fluid pressure sources are presented to diaphragm surface 86 through fluid ports in the transmitter housing (not shown) within which the transducer 52 is located. This pressure effects a proportional deflection of the diaphragm 80 and a corresponding volumetric displacement of dielectric fluid contained in reservoir 78. Displaced fluid from reservoir 78 is transmitted via passageways 82 and 84 communicating a conversely proportional volumetric variation in the dielectric fluid contained in reservoir 68 which, in turn, acts upon the flexible diaphragm 70. The increased spacing between plates of capacitor 74, resulting from the deflection of flexible diaphragm 70, produces a change in capacitance of capacitor 74 relative to the process pressure applied to pressure sensing surface 86. Hence, as the capacitance of the pressure sensing transducer 52 increases, there is a corresponding change in the d.c. output signal generated by the transmitter control circuitry. For applications requiring a differential pressure output between two sources, transducer 52 may be configured with the metalized, pressure sensing diaphragm 70 serving as a common capacitive plate between two diametrically opposed transducer halves. The derived signal from such a differential device would be proportional to the difference of the pressures applied to each half of the bipartite differential transducer.

Under the stresses associated with normal plant operation, cracks in the transducer 52 assembly, such for example as at 88, and other sources of fluid leakage are likely to occur. In practice, the majority of cracks develop in the vicinity of fill tube 72 through which the dielectric fluid slowly migrates, causing an attendant variation in the orientation of diaphragm 70 and a corresponding drift in the capacitive output of device 52. A significant loss of dielectric fluid causes the center of isolation diaphragm 80 to contact transducer body 58 when a sufficient pressure is applied to the diaphragm 80. At such a point, when the capacitance of transducer 52 is no longer proportional to the externally applied pressure, the device is considered to have undergone a catastrophic failure. The prediction that such failure is likely to occur is made available through the monitoring of an electromagnetic excitation of capacitor 74.

The frequency response characteristic of a fluid filled transducer, as at 52, has been determined to be a correlative to the amount of dielectric fluid it contains. Electromagnetic excitation of capacitor 74 has been discovered to provide an effective approach to deriving a device's frequency response characteristic under normal operating conditions without unduly effecting its process output signal. In this regard, a controlled magnetic field, responsive to a control input of a predetermined frequency, is generated to act upon the metallic, flexible diaphragm 70 of transducer 52. The interaction of the magnetic field with the metallic diaphragm 70 causes a time varying, or a.c., signal having a determinable frequency to be induced upon the normal d.c. output signal of the transducer 52. Since the derived fundamental frequency, $f_1$, of a magnetically induced time varying signal from transducer 52 is proportional and can be correlated to the volume of the fluid filling device 52, periodic excitation of the transducer and a determination of a frequency shift of the frequency component, $f_1$, may be used to derive the loss of fill-fluid and to predict the point at which the device is likely to fail. Test coils 54 and 56, represented in cross-section, are mounted with their central axis essentially perpendicular to diaphragm 70 located intermediate the coils. This orientation, commonly referred to as a Helmholtz arrangement, is employed to generate a uniform magnetic field over the relatively large volume of transducer 52, the central axis of which is perpendicular to the metalized diaphragm 70. While an alignment of coils 54 and 56 relative to sensing diaphragm 70 is not critical, a coaxial orientation will induce a transient signal most efficiently.

Figure 3:
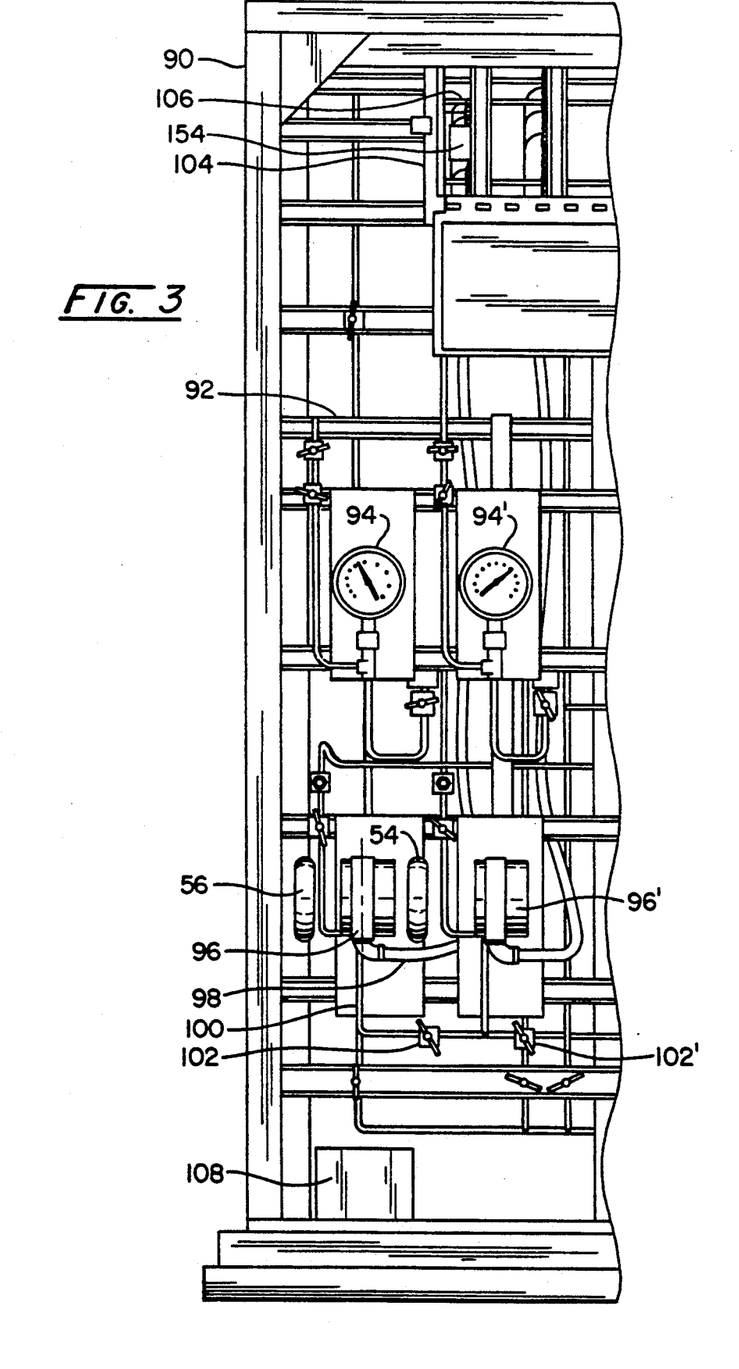
FIG. 3 is a partial elevational view of an instrumentation rack supporting multiple pressure sensing transducers and associated plumbing.

Referring to FIG. 3, a method of orienting field coils 54 and 56 in field influencing adjacency to rack mounted pressure transmitters, such as at 96, is depicted generally at 90. Rack 90 uses structural channels 92 to secure process instrumentation and associated plumbing. In the instrumentation configuration depicted, redundant pressure transmitters 96 and 96' are shown adjacently mounted. External fluid pressures are directed to a pressure transducer (not shown), contained within pressure transmitter 96, via fluid ports in transmitter housing via pressure line 100. The source of fluid pressure to transmitter 96 is controlled by pressure shut-off/bypass valve 102. Visual representation of pressures applied to pressure transmitter 96 may be provide by analog pressure gauges, such as represented at 94, interconnected to corresponding process pressure line inputs. Associated signal wiring from pressure transmitter 96 is directed via electrical conduit 98 to electrical terminal strip 106 housed within electric junction box 104. A pick-up coil, as at 154, is inductively coupled to the signal output from transmitter 96 for sensing the presence of the effects of coils 54 and 56 on its output. The output of the pick-up coil 154 is directed to terminal strip 106 as well. Dual field coils 54 and 56, are mounted in a Helmholtz arrangement astride the pressure transmitter 96, for effecting the evaluation of the capacitive transducer housed within it. Associated local coil excitation control circuitry is shown generally at 108.

Figure 4:
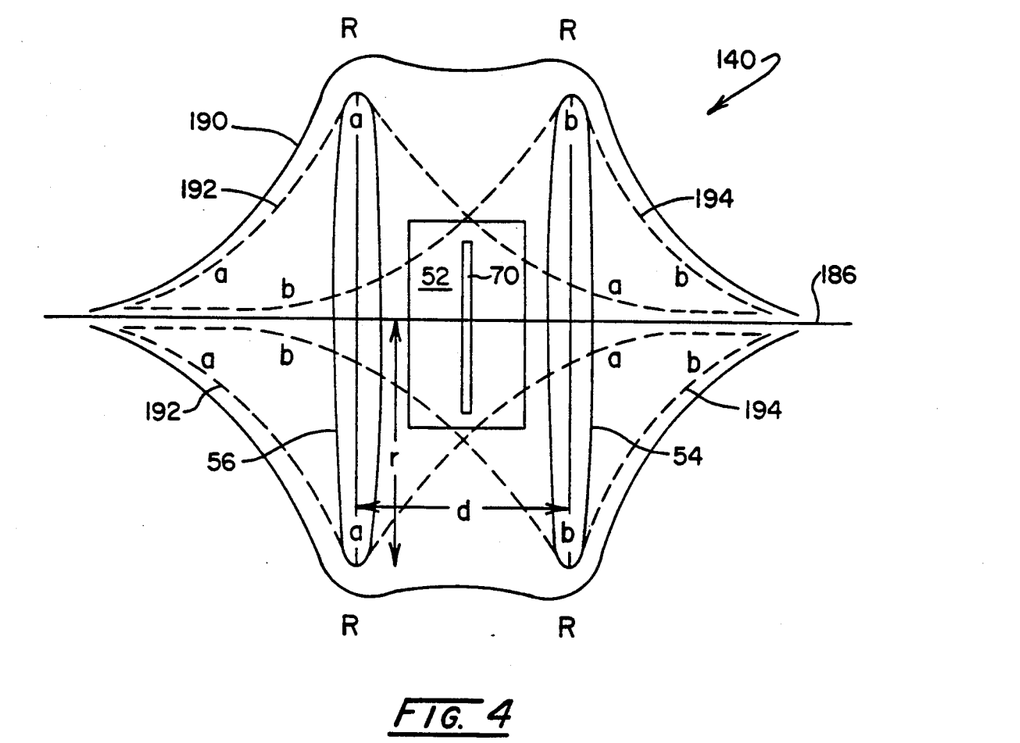
FIG. 4 is a cross sectional schematic view of resulting magnetic fields generated by a Helmholtz coil arrangement according to the invention.

Referring now to FIG. 4, a Helmholtz coil arrangement, represented generally at 140, and its attendant magnetic fields are shown schematically. Similarly constructed coils 54 and 56, each having a radius r, are shown mounted coaxially along axis 186, separated by a distance, d, equal to the common radius, r, of coils 54 and 56. A transducer 52, having an internal, magnetically influenceable diaphragm 70, is shown mounted along the same axis 186 and intermediate field coils 54 and 56. When individually supplied with an electrical current, field coils 54 and 56 each generate independent time varying magnetic fields, as depicted by dashed envelopes aa (192) and bb (194). However, when the coils 54 and 56 are simultaneously excited with an identical current, a single, uniform magnetic field 190, represented by envelope RR, is generated. This resulting magnetic field 190 acts perpendicularly upon the surface of the intermediately located metalized diaphragm 70, causing a proportional deflection thereof. The deflection of metalized diaphragm 70, forming one plate of the capacitor 74, described in conjunction with FIG. 2, generates a detectable transducer out signal having a time varying component.

Figure 5:
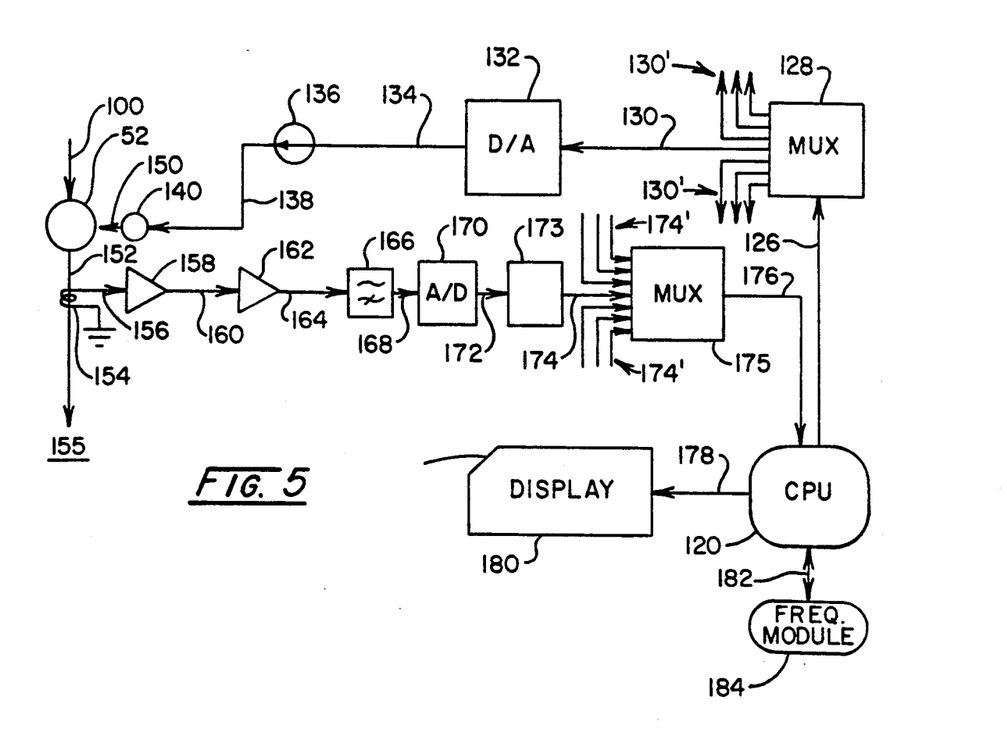
FIG. 5 is a block diagram of the transducer excitation and transient response monitoring and evaluation system according to the invention.

Looking to FIG. 5, a system for the evaluation of pressure transducers is shown schematically and in block diagrammatic form. In the figure, a central processing unit (CPU) is shown at 120, to provide, among other things, electromagnetic excitation of the pressure transducers. Device 120 may be provided as a dedicated personal computer or as a component part of a larger host computer, and generates a digital waveform for asserting a timing control input to the calibration components of the circuit. This digital output is directed by bus or the like, represented by line 126, to a multiplexing function shown at block 128. The digital timing waveform is then directed from multiplexer 128, for example, by lead 130 to a signal conversion function, shown by block 132. Generally, installations will have numerous transducers to test, thus a multiplexing function is utilized as at 128. Additional leads, such as at array 130', are shown extending from device 128 to distribute similar timing functions to other transducer excitation circuits. The noted signal conversion at block 132 is provided by digital-to-analog (D/A) converter wherein the digital timing waveform is converted to its analog equivalent. This analog output at line 134 is directed to the input of a constant current supply 136, the output of which, appearing at line 138, is applied to the windings of field coils, as earlier described at 54 and 56, the Helmholtz coil arrangement now being represented symbolically at 140. A pulsed magnetic field generated by Helmholtz arrangement 140, shown schematically by an arrow 150, acts upon a proximately located transducer, represented by a circle with the earlier identifying numeration 52. The applied static process pressure being monitored by transducer 52 is represented by inwardly directed arrow 100. Transducer 52 derives an output, representing a real-time local pressure indication, at output line 152. Output line 152 is directed to remotely-located process control and safety related monitoring systems, indicated generally at 155.

Figure 6A:
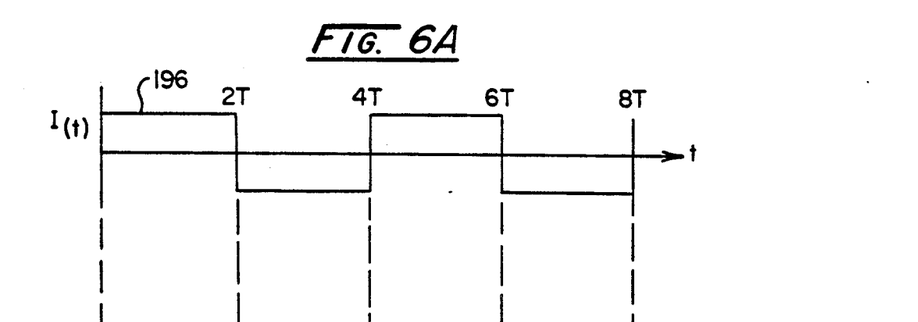
FIG. 6A is a graphic presentation of the current waveform supplied to the Helmholtz coil arrangement over time according to the invention.

Now referring to FIG. 6A, an excitation waveform is depicted representing the reversing pulsed d.c. current supplied to Helmholtz coil arrangement 140, by constant current supply 136, and shown generally at 196. The predetermined, time varying waveform 196 is seen having a pulse width equal to period 2T and a pulse repetition interval of period 4T. The result of directing waveform 196 into Helmholtz arrangement 140 is the generation of a magnetic field by its field coils 54 and 56.

Figure 6B:
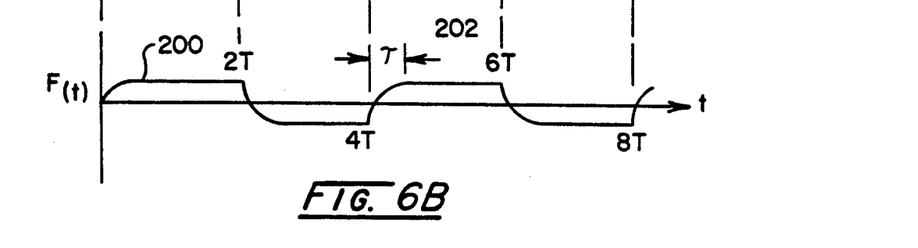
FIG. 6B is a graphic presentation of the waveform of the resulting magnetic force generated by the Helmholtz coil arrangement over time according to the invention.

Referring to FIG. 6B, the resulting time varying magnetic field is represented over period 8T, by waveform 200. Slight recurring distortion, visible at the leading edges of waveform 200, generally shown by period $\tau$ at 202, is a function of the inductive and resistive properties the windings of coils 54 and 56. In designing the duration of period T, such electrical properties of excitation field coils 54 and 56 in Helmholtz arrangement 140 are the primary design considerations. Period T is optimized when pulse period 2T provides sufficient time for an induced a.c. transient signal, present in the transducer derived output at line 152, to be essentially damped prior to a change in polarity from the constant current supply 136.

Figure 7:
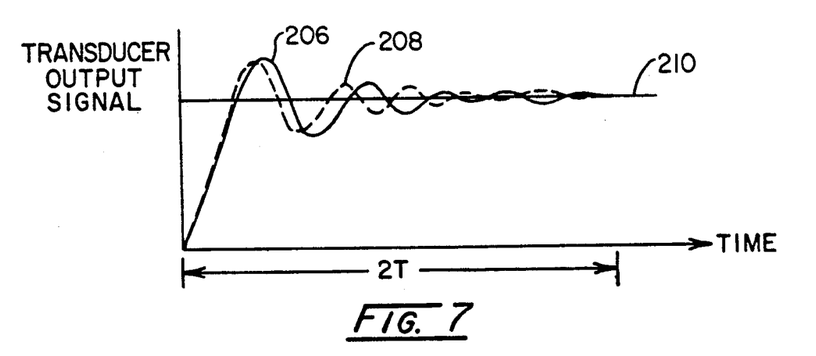
FIG. 7 is a graphic presentation of the transducer transient signal waveforms superposed upon a steady transducer d.c. output over time.

Referring to FIG. 7, three time varying monitor signals, representing transducer responses to externally applied forces, are presented. The normal fluid pressure responsive signal appearing at transducer output 152 is depicted in solid line fashion as waveform 210. The essentially d.c. waveform 210 exhibits no fluctuations over period 2T since the fluid pressure it represents is relatively constant. The effect of an a.c. transient signal, such as that induced by Helmholtz coil arrangement 140, is represented in the figure by the a.c. waveform shown in solid line fashion at 206. Waveform 206 is shown to have a frequency characteristic and an amplitude which is significantly dampened over period 2T. A second waveform, shown in dashed line fashion at 208, is seen to exhibit a higher frequency characteristic and represents the frequency response of transducer 52 after an ascertainable loss of internal dielectric fluid. The amplitude and frequency characteristics of a.c. transient signal 206 cause it to be effectively attenuated prior to reaching the process control and safety monitoring equipment 155 by the resistive and capacitive characteristics of intermediate cabling (not shown).

Referring once again to FIG. 5, the remainder of the diagram discloses a time varying, or a.c., signal monitoring and processing circuit. An inductively coupled pick-up coil 154, proximately located to transducer 52, detects the presence of a.c. signals at transducer output at line 152 and provides a corresponding monitor signal. The output at line 152 typically will contain induced a.c. transient 206 as well as other, spurious a.c. process signal noises in addition to it primary process pressure responsive d.c. component. Once sensed by pick-up coil 154, the a.c. component of transducer output 152 is output via line 156 to the input of an amplifier 158. This first amplifier 158 functions as an isolator to assure that signal noise and/or anomalies that may be generated by the CPU 120 controlled transducer excitation circuitry are not reverse-coupled into transducer output 152. Thus isolated, the output of amplifier 158 is coupled to a second amplifier, represented at 162, by line 160. Amplifier 162 functions to increase the signal gain of the time varying component of the monitor signal. This amplified signal, which corresponds to the signal represented by waveform 206 in FIG. 7, is directed to high pass filter 166 via line 164. Filter 166 serves to remove a.c. signal components below a predetermined frequency, which includes residual process noise, while permitting higher frequency transient signal 206 to pass. The thus-filtered signal, now present at line 168, is directed to analog-to-digital (A/D) converter 170. A/D converter 170 transforms the now amplified and filtered transient signal into its corresponding digital equivalent. Once converted, the now digitized transient signal is directed via line 172 to a waveform averaging, or digital filtering, function represented at block 173. Waveform averaging function 173 derives an average time varying, a.c., signal component which serves to reduce or remove spurious or coupled line noises from the transient signal 206 prior to determination of its fundamental frequency. Improved signal-to-noise linearity is thereby achieved, enhancing the results of subsequent determination of fundamental frequency, $f_1$.

The averaged digital waveform is directed via line 174 to a predetermined input channel of a signal multiplexer, represented in FIG. 5 by block 175. In complement with the multiple channel transducer excitation approach, described in conjunction with multiplexer 128 and array 130', the corresponding return transient signal information is represented by array 174'. Multiplexer 175 combines multiple data channels containing return transient signal information into a single data channel and directs it to CPU 120 via line 176. CPU 120 stores return signal information in buffered memory, at addresses corresponding to the respective instrumented transducers, pending later processing. Upon demand, signals are transferred into the working memory of CPU 120 where they are directed to frequency processing module 184 via bus 182 for determination of their respective predetermined frequency components, such as their fundamental frequencies. The determination of a complex signal's fundamental frequency may be accomplished mathematically by Fourier analysis which breaks a complex waveform into a series of simple harmonic functions. This frequency analysis may be either performed by an algorithm resident in CPU 120 or as separate frequency processing hardware available, for example, as a Model 9410 Oscilloscope marketed by Le Croy. Once determined, the resulting predetermined frequency component of a given transducer, as at 52, is stored at an identifiable address by CPU 120 for later retrieval, correlation and analysis. CPU 120 communicates with a display represented at 180 via a communications link represented by line 178. Display 180 may be provided as a type of visual display unit (VDU) and/or a printing device.

The value of the fundamental frequency, $f_1$, of a damped oscillation, as described in conjunction with the signal represented by waveform 206 in FIG. 7, induced upon the metalized sensing diaphragm (membrane) 70, can be shown analytically by the following formula:

$$f_1 = \frac{d}{4\pi D^2}\left[\frac{5gE}{\rho}\left(1 - \frac{5\pi^2\mu_o^2 D^6}{4g\rho E d^4 R^4}\right)\right]^{\frac{1}{2}} Hz$$

where:
d = thickness of central membrane (inches)
E = membrane modulus for stainless steel (psi)
D = diameter of the central membrane (inches)
g = acceleration of gravity (inches/sec.$^2$)
$\rho$ = effective density (lb$_f$/inches$^3$)
$\mu_o$ = kinematic viscosity of fill-fluid (lb$_f$-seconds/inch$^2$)
R = equivalent radius of ceramic bore holes (inches).

The modulus, E, of a metalized membrane, such as sensing diaphragm 70, is given by the formula:

$$E = \frac{E_s}{(1 - \epsilon^{-2})}$$

where $\epsilon$ is Poisson's ratio and $E_s$ is Young's modulus for steel. For a detailed discussion of the determination of the modulus of a given material membrane, refer, for example to Timoshenko, *Applied Elasticity*, Westinghouse Technical Night School Press, 1925.

The effective density, $\rho$, is given by the formula:

$$\rho = \rho_s\left(1 + \frac{\rho_o h}{\rho_s d}\right)$$

where $\rho_s$ and $\rho_o$ are the densities of steel and dielectric fluid, respectively, and h is the mean height of the column of fluid above the center of the sensing membrane 70. The second term contains the mass of fluid, which changes as the dielectric fluid leaks from the transducer 52, thereby reducing h slowly over time.

The formula for determining the fundamental frequency, $f_1$, demonstrates that, to a good approximation, for small damping, $f_1$ varies according to the following formula:

$$f_1 \approx \rho^{-\frac{1}{2}}$$

or, from the formula for effective density:

$$f_1 = \left(1 + \frac{\rho_o h}{\rho_s d}\right)^{-\frac{1}{2}}$$

As can be seen from the foregoing formulae, an upward frequency shift over a period of time is a strong correlative of dielectric fluid leakage. Tests have shown that measurable frequency shifts as low as a few Hertz can easily be detected, demonstrating a sensitivity of approximately one part in ten thousand. Therefore, a leak corresponding to a frequency shift of several Hz would represent a loss of as little as 0.1 cm$^3$, i.e., a very small leak. The determination and tracking the frequency shift in a transducer's induced, time varying output over time is a sensitive and accurate measure of its fluid inventory and, consequently, a valuable predictor of its functional integrity.

Referring again to FIG. 7, the general behavior of the induced a.c. signal of a known "good" transducer is shown by the waveform 206, without regard to polarity. Since higher order harmonics are generally not excited by a uniform magnetic force, such as provided by the Helmholtz coil arrangement 140, the a.c. signal waveform 206 is depicted as being dominated by its fundamental frequency. This simplifies the determination of the value for the fundamental frequency. As demonstrated in the preceding formulae, the frequency response of the metalized sensing diaphragm 70 within the transducer 52 increases with the loss of its internal dielectric fluid. Such a shift in frequency response over time 2T is depicted by the dashed waveform 208 in FIG. 7. By comparing measured frequency component, $f_1$, values of a transducer under test to previously derived benchmark values from similar transducers at predetermined stages of fluid loss, an evaluation can be made when that transducer is likely to suffer a catastrophic failure due to a substantial loss of fluid. This enables the functional life of a transducer to be maximized by preventing premature removal of the device attributable to unduly conservative safety margins.

Figure 8:
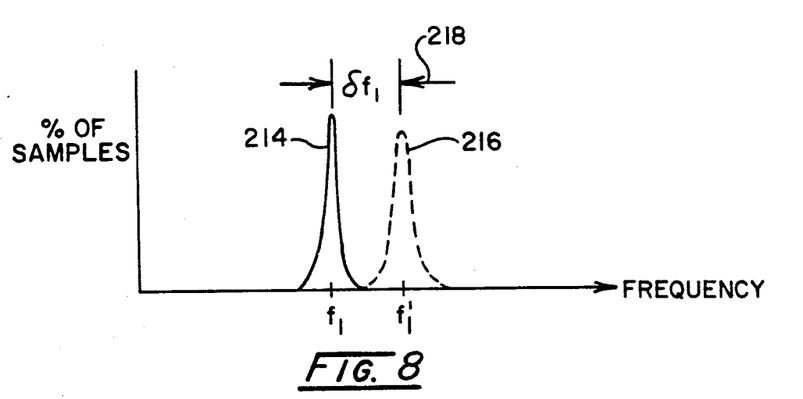
FIG. 8 is a histogram of fundamental frequency responses exhibited by a transducer having two distinct volumes of internal fill-fluid.

The reliability of the disclosed in situ evaluation of capacitive type transducers is further enhanced by the ability of CPU 120 to automatically collect and store derived fundamental frequencies from numerous transducers of interest. Looking to FIG. 8, repeated calculations of frequency $f_1$ over many cycles of period 2T for a given transducer, enable construction of histograms such as 214 and 216. Histogram 214, derived from a standard or a "good" transducer, is seen to have a sharper, lower frequency characteristic when compared to histogram 216. However, loss of dielectric fluid from a leaking transducer produces a histogram having a higher frequency characteristic and a broader bandwidth, such as depicted as curve 216 having center frequency, $f_1'$. The difference between center frequencies $f_1$ and $f_1'$ ($\delta f_1$) at 218 is indicative of a corresponding loss of fluid within the transducer between the time histogram 214, having center frequency $f_1$, was originally determined and when histogram 216, having center frequency $f_1'$, was subsequently determined. Calculated leak rates may be graphically presented to an operator by display 180.

Figure 9:
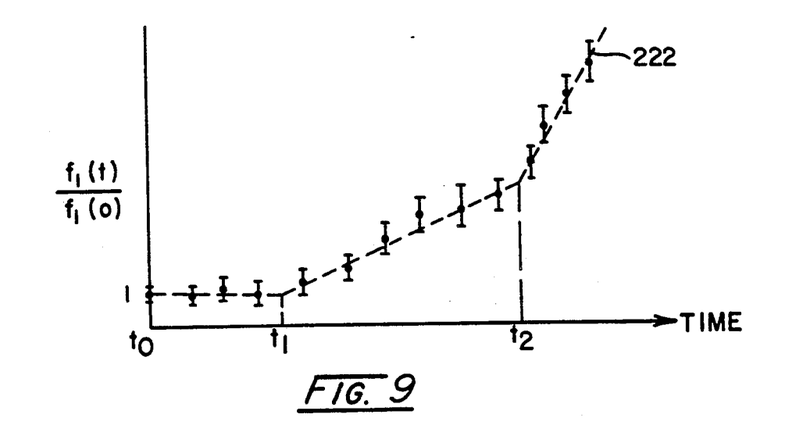
FIG. 9 is a curve showing the ratio of transducer fundamental frequencies plotted over time according to the invention.

Referring to FIG. 9, the curve identified at 222 depicts a plot of the ratio of the fundamental frequency of a given transducer calculated at time ($f_{1[t]}$) compared to its original fundamental frequency ($f_{1[o]}$) determined at time $t_0$, constructed over time. Data points along plot 222 consist of the average of a range calculated ratio values, represented by vertical error lines extending in the y axis direction from each plot point. Plot 222 discloses a transducer having a fundamental frequency response ratio equal to unity from time $t_0$ until time $t_1$. During this time period, plot 222 displays a curve with no slope. A plot having a slope equal to zero implies no increase in the leak rate between time $t_0$ and time $t_1$. Assuming that the transducer under test was not leaking when installed, a slope equal to zero represents that it is still not leaking. An examination of the plot 222 between time $t_1$ and time $t_2$ discloses a marked increase in the slope, representing a proportional and steady rate of fluid leakage. The further incremental failure of the transducer, is manifested by the increase slope of curve 222 beginning at time $t_2$, where a second, distinct rate of fluid loss is indicated. In a preferred embodiment of the invention, actual calculated frequency response ratios, such as represented by plot 222 are compared against predetermined benchmark ratios derived from sample transducers at various controlled fluid loss levels. Using this technique, CPU 120 calculates the quantity of fluid lost and provides a performance correlative visual indication when a given transducer is likely to suffer a catastrophic failure due to loss of dielectric fluid at the last rate of leakage. Switching or sequentially displaying plot 222 on the display device 180 enables the functional integrity of a given or any number of sampled instrumented transducers to be constantly monitored. A faulty transducer is replaced or by-passed when its functional integrity is outweighed by the inherent risks associated with a probable impending failure. Alternately, CPU 120 may provide audio and/or visual indicia to an operator annunciator panel at such time an instrumented transducer has lost a predetermined amount of fluid and has caused its functional integrity to become suspect.

Since certain changes may be made in the above described method and system without departing from the scope of the invention herein involved, it is intended that all matter contained in the above description or shown in the accompanying drawings shall be interpreted as illustrative and not in a limiting sense.

I claim:

1. The method for evaluating the performance of a pressure responsive transducer having a surface movable with pressure induced volume variations of a contained fluid and an output signal varying in correspondence with the deflection of said surface, comprising the steps of:

generating a time varying magnetic field from a location effecting a field induced deflection of said surface;

monitoring said output signal for a corresponding time varying signal component;

deriving a predetermined frequency component of a detected said time varying signal component;

storing said predetermined frequency component;

comparing said predetermined frequency component with a previously derived frequency component of a previous field induced deflection to determine the presence of a frequency shift; and correlating said frequency shift with said deflection of said surface so as to evaluate the volume of said contained fluid.

2. The method of claim 1 wherein the step of deriving a predetermined frequency component of a selected said time varying signal component includes averaging multiple ones of successive said derived predetermined frequency components.

3. The method of claim 1 wherein the step of deriving a predetermined frequency component of a selected said time varying signal component includes the step of converting said time varying signal component to a digitized frequency signal component.

4. The method of claim 1 wherein the step of deriving a predetermined frequency component of a selected said time varying signal component includes the step of averaging a sequence of said detected time varying signal components to derive a filtered time varying signal component.

5. The method of claim 1 wherein the step of comparing said predetermined frequency component with a previously derived frequency component of a previous field induced deflection to determine the presence of a frequency shift includes the step of providing a performance correlative output upon determination of a predetermined frequency shift.

6. The method of claim 5 further including the step of removing said transducer under evaluation from service when said performance correlative output is present.

7. The method of claim 1 wherein said step of determining a predetermined frequency component of a detected said time varying signal component derives a fundamental frequency.

8. In a nuclear power generating facility having at least one pressure responsive transducer immersed in a process fluid, the method for evaluating the performance of said pressure responsive transducer having a surface movable with pressure induced volume variations of a contained dielectric fluid and deriving an output signal in correspondence with the deflection of said surface, comprising the steps of:

generating a time varying magnetic field from a location effecting a field induced deflection of said surface;

monitoring said output signal for a time varying signal component;

determining a predetermined frequency component of a detected said time varying signal component;

storing said predetermined frequency component;

comparing said predetermined frequency component with a previously derived frequency component of a previous field induced deflection to determine the presence of a frequency shift; and correlating said frequency shift with said deflection of said surface.

9. The method of claim 8 wherein said time varying magnetic field is generated by test coils immersed in said process fluid and mounted in influencing adjacency with said transducer.

* * * * *